UNITED STATES PATENT OFFICE.

CARL HEINRICH WOLFF, OF BLANKENESE, PRUSSIA, GERMANY, ASSIGNOR TO F. WEBER & CO., OF PHILADELPHIA, PENNSYLVANIA.

GALVANIC DRY ELEMENT.

SPECIFICATION forming part of Letters Patent No. 417,458, dated December 17, 1889.

Application filed September 7, 1889. Serial No. 323,250. (No specimens.) Patented in Germany September 11, 1888, No. 47,164.

*To all whom it may concern:*

Be it known that I, CARL HEINRICH WOLFF, a subject of the King of Prussia, residing at Blankenese, Schleswig-Holstein, Prussia, Germany, have invented a new and useful Improvement in Galvanic Dry Elements, (for which I have obtained Letters Patent in Germany of date September 11, 1888, No. 47,164,) which improvement is fully set forth in the following specification.

My invention consists of the addition of precipitated hydrate of alumina to a mixture of plaster-of-paris with other liquid-absorbing inactive material and generating-salts or their solutions employed as a filling-matter for galvanic dry elements.

In carrying out my invention I take precipitated hydrate of alumina, plaster-of-paris or gypsum, and generating-salts and combine the same, the action of the hydrate of alumina serving to loosen the otherwise heavy and compact matters of the plaster-of-paris and reduce the inner resistance of the element.

Having thus described my invention, what I claim as new, and desire to secure by Letters Patent, is—

1. A generator for a galvanic dry element having hydrate of alumina therein, substantially as and for the purpose set forth.

2. A composition consisting of plaster-of-paris, a generating-salt, and hydrate of alumina, substantially as and for the purpose set forth.

CARL HEINRICH WOLFF.

Witnesses:
C. ZANENTZKY,
CHAS. H. BURKE.